United States Patent
Sampei et al.

(10) Patent No.: US 7,738,770 B2
(45) Date of Patent: Jun. 15, 2010

(54) RECORDING/PLAYBACK APPARATUS AND INFORMATION PROCESSING APPARATUS

(75) Inventors: Konomu Sampei, Ibaraki (JP); Yoshiaki Matsuoka, Hitachinaka (JP); Hiroaki Arima, Hitachinaka (JP); Hisashi Ohta, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 11/178,608

(22) Filed: Jul. 12, 2005

(65) Prior Publication Data

US 2006/0104604 A1 May 18, 2006

(30) Foreign Application Priority Data

Nov. 12, 2004 (JP) .............................. 2004-328361

(51) Int. Cl.
*H04N 5/93* (2006.01)
*G11B 27/00* (2006.01)

(52) U.S. Cl. ........................................... 386/52; 386/46
(58) Field of Classification Search .................. 386/46, 386/52

See application file for complete search history.

(56) References Cited

U.S. PATENT DOCUMENTS

| 2001/0007544 A1* | 7/2001 | Fujisawa et al. | 369/47.12 |
| 2001/0041049 A1* | 11/2001 | Kanda | 386/52 |
| 2001/0043366 A1 | 11/2001 | Kameyama | |
| 2002/0186961 A1 | 12/2002 | Kikuchi et al. | |

FOREIGN PATENT DOCUMENTS

| JP | 08-272332 | | 10/1996 |
| JP | 09-153274 | | 6/1997 |
| JP | 09153274 A | * | 6/1997 |
| JP | 11-066821 | | 3/1999 |
| JP | 11066821 A | * | 3/1999 |
| JP | 11-176096 | | 7/1999 |
| JP | 2001-250319 | | 9/2001 |
| JP | 2001-250369 | | 9/2001 |
| JP | 2001250369 A | * | 9/2001 |

(Continued)

OTHER PUBLICATIONS

Japanese Office Action issued in Japanese Patent Application No. JP 2004-328361, dated Oct. 21, 2008.

(Continued)

*Primary Examiner*—Thai Tran
*Assistant Examiner*—Girumsew Wendmagegn
(74) *Attorney, Agent, or Firm*—McDermott Will & Emery LLP

(57) ABSTRACT

A recording/playback apparatus is disposed with a first recording/playback unit, a second recording/playback unit, and a display unit. The display unit includes a first display representing the first recording/playback unit, a second display representing the second recording/playback unit, and plural light-emitting elements disposed between the first display and the second display. The recording/playback apparatus is also disposed with an input unit to which is inputted a start instruction of dubbing for transmitting and receiving data between the first recording/playback unit and the second recording/playback unit. When the start instruction is inputted to the input unit and dubbing is started, the display unit displays the direction of dubbing, the speed of dubbing, and the percentage of completion of dubbing by lighting the plural light-emitting elements.

7 Claims, 5 Drawing Sheets

FOREIGN PATENT DOCUMENTS

| | | |
|---|---|---|
| JP | 2001-325139 | 11/2001 |
| JP | 2002-109870 | 4/2002 |
| JP | 2003-046919 | 2/2003 |
| JP | 2003046919 A * | 2/2003 |
| JP | 2003-179864 | 6/2003 |
| JP | 2003-187522 | 7/2003 |
| JP | 2004-303417 | 10/2004 |

OTHER PUBLICATIONS

Japanese Office Action issued in Japanese Patent Application No. JP 2004-328361 dated Jan. 20, 2009.

* cited by examiner

FIG.3

HANDY MENU — 110

| PLAY LIST | TIMER PROGRAM RECORDING | SLOW PLAYBACK |
|---|---|---|
| TIME NAVIGATION | PROGRAM PLAYBACK | DUBBING — 110a |
| CANCEL DUBBING | CANCEL TIMER PROGRAM RECORDING | |

FIG.4

DUBBING DIRECTION MENU — 111

| HDD | —> | DVD — 111a |
|---|---|---|
| DVD | —> | HDD |
| HDD | —> | HDD |
| HDD | —> | D-VHS |

FIG.5

DUBBING MODE MENU — 112

| HIGH SPEED | 112a |
|---|---|
| RATE CONVERSION (XP) | 112b |
| RATE CONVERSION (SP) | |
| RATE CONVERSION (LP) | |
| RATE CONVERSION (EP) | |
| RATE CONVERSION (FR) | |

FIG.6

CONTENTS MENU — 113

| PROGRAM 1 | PROGRAM 2 | PROGRAM 3 | PROGRAM 4 |
|---|---|---|---|
| PROGRAM 5 | PROGRAM 6 | PROGRAM 7 | PROGRAM 8 |
| PROGRAM 9 | PROGRAM 10 | PROGRAM 11 | |

RECORDING/PLAYBACK APPARATUS AND INFORMATION PROCESSING APPARATUS

This application claims the benefit of priority of Japanese Application No. 2004-328361 filed Nov. 12, 2004, the disclosure of which also is entirely incorporated herein by reference.

BACKGROUND

1. Field of the Invention

The present invention relates to technology for improving the display of the mode of dubbing between recording/playback units in a recording/playback apparatus disposed with plural recording/playback units.

2. Description of the Related Art

JP-A-2001-250369 discloses a recording/playback apparatus disposed with a control panel where plural light-emitting diodes (LEDs) are arranged between displays representing recording/playback units, such as for compact discs (CDs) and minidiscs (MDs). The dubbing direction is displayed by sequentially moving, in accordance with the dubbing direction, the lighted portion of the LEDs beginning with the LED closest to the dubbing source (i.e., the playback source) and ending with the LED closest to the dubbing destination (i.e., the recording destination). When dubbing is conducted at twice the ordinary speed, the LEDs are lighted at twice their ordinary speed to visually indicate the dubbing speed.

JP-A-2001-325139 discloses technology that displays, on a computer screen, the status of the progress of transfer of a data file from an imaging device to the computer.

When plural types of information representing the status of dubbing are displayed at the time of dubbing, the user can easily grasp the status of dubbing, which is useful. But when plural types of information are displayed separately, there is the problem that the display of these types of information becomes small and the visibility is poor because the display screen of the recording/playback apparatus is limited.

It is necessary to provide an apparatus that improves the visibility of the dubbing mode display.

SUMMARY

A recording/playback apparatus pertaining to the present invention is disposed with a first recording/playback unit, a second recording/playback unit, and a display unit. The display unit includes a first display representing the first recording/playback unit, a second display representing the second recording/playback unit, and plural light-emitting elements disposed between the first display and the second display. The recording/playback apparatus is also disposed with an input unit to which is inputted a start instruction of dubbing for transmitting and receiving data between the first recording/playback unit and the second recording/playback unit. When the start instruction is inputted to the input unit and dubbing is started, the display unit displays the direction of dubbing, the speed of dubbing, and the percentage of completion of dubbing by lighting the plural light-emitting elements.

An information processing apparatus pertaining to the invention is disposed with a first information processing unit, a second information processing unit, and a display unit. The display unit includes a first display representing the first information processing unit, a second display representing the second information processing unit, and plural light-emitting elements disposed between the first display and the second display. When data is transmitted and received between the first information processing unit and the second information processing unit, the display unit displays the direction of data transmission and the percentage of completion of data transmission by lighting the plural light-emitting elements.

BRIEF DESCRIPTION OF THE DRAWINGS

FIG. 3 is a diagram showing an example of a handy menu;

FIG. 4 is a diagram showing an example of a dubbing direction menu;

FIG. 5 is a diagram showing an example of a dubbing mode menu;

FIG. 6 is a diagram showing an example of a contents menu;

DETAILED DESCRIPTION

An embodiment of a recording/playback apparatus according to the present invention will be described below using FIGS. 1 to 9C.

Figure 1:
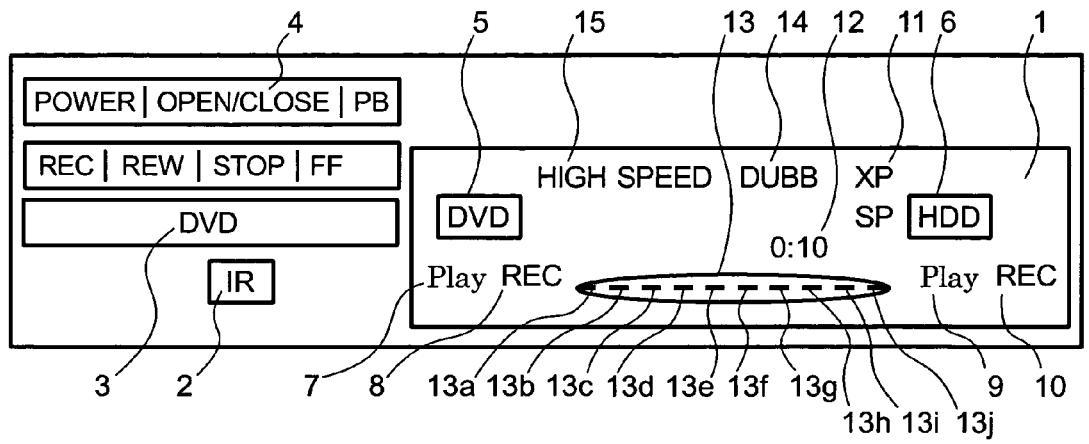
FIG. 1 is a diagram showing an example of a front exterior of a recording/playback apparatus.

FIG. 1 is a diagram showing an example of a front exterior of the recording/playback apparatus. A fluorescent display tube 1, a remote control light-receiving portion 2, a DVD insertion slot 3, and operation buttons 4 are disposed on the front surface of the recording/playback apparatus. The inside of the fluorescent display tube 1, which is a multi-display unit, is disposed with a DVD recording/playback unit display 5, a HDD recording/playback unit display 6, a playback display 7 for the DVD recording/playback unit, a recording display 8 for the DVD recording/playback unit, a playback display 9 for the HDD recording/playback unit, and a recording display 10 for the HDD recording/playback unit. The playback display 7, the recording display 8, the playback display 9, and the recording display 10 indicate that the DVD recording/playback unit and the HDD recording/playback unit are conducting playback or recording. The inside of the fluorescent display tube 1 is also disposed with a recording rate display 11, a playback time display 12, a dubbing display 14, and a high-speed dubbing display 15. An illumination display unit 13 is disposed between the DVD recording/playback unit display 5 and the HDD recording/playback unit display 6. The illumination display unit 13 is configured by illumination bars 13a to 13j that are light-emitting elements such as light-emitting diodes (LEDs). In this example, the illumination display unit 13 is disposed with ten illumination bars, but this number may be increased or reduced in accordance with the size of the fluorescent display tube 1.

Although a fluorescent display tube is used in this example, liquid crystal may be used instead. Also, in this example, "Play" and "REC" are used for the playback display 7 and the recording display 8 of DVD recording/playback unit and for the playback display 9 and the recording display 10 of the HDD recording/playback unit, but the displays are not limited thereto. For example, other characters, or symbols or marks representing playback/recording, may also be used.

Figure 2:
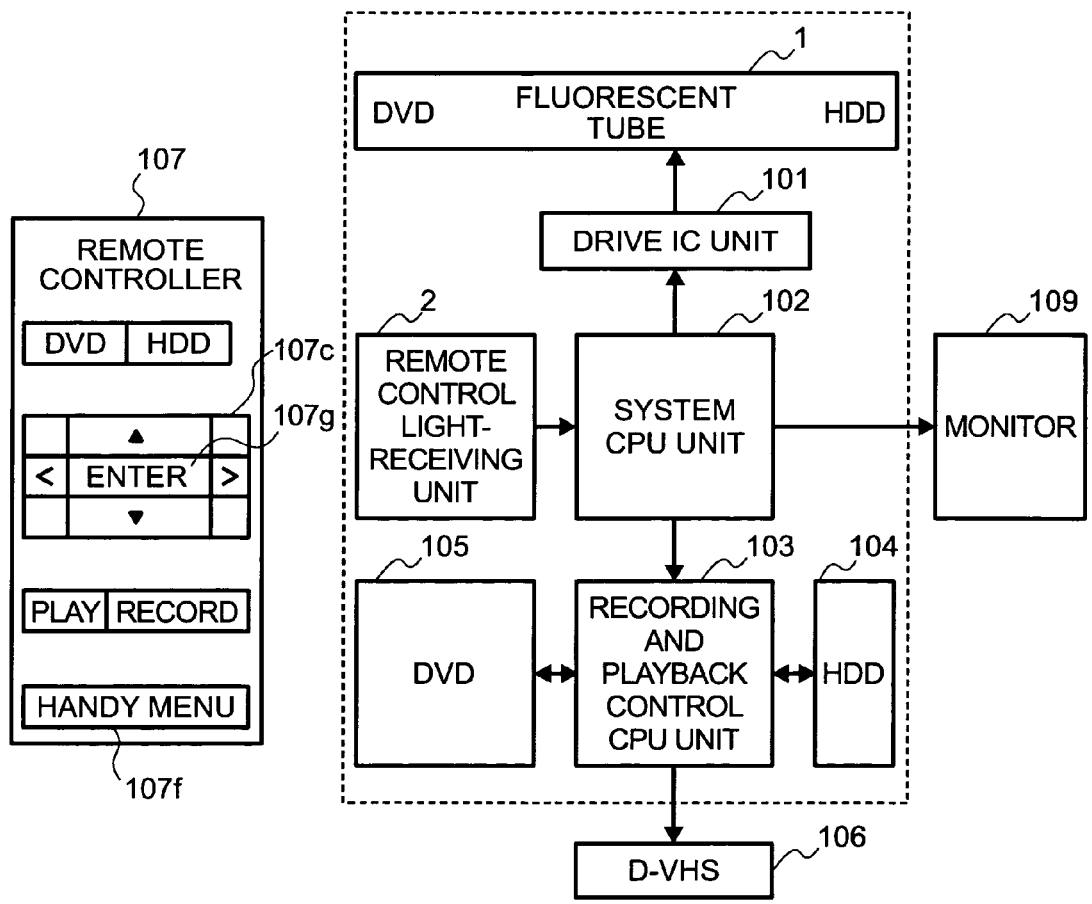
FIG. 2 is a block diagram showing an example of the schematic configuration of the recording/playback apparatus.

FIG. 2 is a block diagram showing an example of the schematic configuration of the recording/playback apparatus.

The recording/playback apparatus is disposed with the fluorescent display unit 1, a drive IC unit 101 that drives the fluorescent display unit 1, a system CPU unit 102, a HDD recording/playback unit 104, a DVD recording/playback unit 105, a recording/playback control CPU unit 103 that controls the HDD recording/playback unit 104 and the DVD recording/playback unit 105, and the remote control light-receiving unit 2. The system CPU unit 102 controls the entire recording/playback apparatus, such as the drive IC unit 101 and the recording/playback control CPU unit 103. Moreover, the recording/playback apparatus is connectable to external devices, such as a D-VHS recorder/player 106 and a monitor 109, via connection terminals (not shown). A user can operate the recording/playback apparatus using a remote control transmitter 107. The remote control transmitter 107 is disposed with a cursor button 107c for selecting menus and the like, a handy menu button 107f for causing a handy menu to be displayed which is used when conducting dubbing, and an enter button 107g for entering a selected function.

The operational procedure of the user for dubbing signals in an ordinary speed mode from the HDD recording/playback unit 104 to the DVD recording/playback unit 105 will be described. FIGS. 3 to 6 show menus displayed by the monitor 109. FIG. 3 shows a handy menu 110, FIG. 4 shows a dubbing direction menu 111, FIG. 5 shows a dubbing mode menu 112, and FIG. 6 shows a contents menu 113. When the user presses the handy menu button 107f on the remote control transmitter 107, the signal is received by the remote control light-receiving unit 2, and the system CPU unit 102 causes the handy menu 110 shown in FIG. 3 to be displayed on the monitor 109. When the user uses the cursor button 107c on the remote control transmitter 107 to select dubbing 110a and enters the selection using the enter button 107g on the remote control transmitter 107, the monitor 109 displays the dubbing direction menu 111 shown in FIG. 4. When the user selects HDD->DVD 111a using the cursor button 107c and enters the selection using the enter button 107g on the remote control transmitter 107, the monitor 109 displays the dubbing mode menu 112 shown in FIG. 5. When the user selects rate conversion (XP) 112b to decide upon the recording rate using the cursor button 107c and enters the selection using the enter button 107g, the monitor 109 displays the contents menu 113 shown in FIG. 6. The contents menu 113 displays a list of programs recorded in the HDD recording/playback unit 104. The user enters a selection by selecting, for example, program 3 from the contents menu 113 and pressing the enter button 107g on the remote control transmitter 107.

When the enter button 107g on the remote control transmitter 107 is pressed by the user, the recording/playback control CPU unit 103 controls the HDD recording/playback unit 104 and the DVD recording/playback unit 105 in accordance with a control signal from the system CPU unit 102 so that data is dubbed from the HDD recording/playback unit 104 to the DVD recording/playback unit 105. The drive IC unit 101 lights the HDD recording/playback unit display 6, the DVD recording playback unit display 5, the playback display 9 of the HDD recording/playback unit, the recording display 8 of the DVD recording/playback unit, the dubbing display 14, which indicates that dubbing is in progress, and the recording rate display 11 of the fluorescent display tube 1. When the dubbing operation is started, the recording/playback control CPU unit 103 acquires, from the HDD recording/playback unit 104, the playback time of the program (contents) to be dubbed and displays this on the playback time display 12. The system CPU unit 102 acquires, from the HDD recording/playback unit 104, the recording time of the program (contents) to be dubbed, calculates the percentage of completion from the recording time and the playback time of the program, and computes the number of illumination bars to be used for lighting. Then, the system CPU unit 102 controls the drive IC unit 101 to drive the fluorescent display tube 1 to sequentially light illumination bars of a number corresponding to the percentage of completion, beginning with the illumination bar 13j closest to the HDD recording/playback unit display 6 and moving towards the DVD recording/playback unit display 5. At this time, the system CPU unit 102 controls the drive IC unit 101 to drive the fluorescent display tube 1 to change the speed at which the illumination bars are made to blink or to sequentially light plural illumination bars in accordance with the dubbing speed.

Thus, the percentage of completion of dubbing, the dubbing direction, and the dubbing speed can be displayed by the illumination display unit 13. Thus, the display can be enlarged in a limited display screen of a recording/playback apparatus, and the visibility can be improved. It will be noted that in the example shown in FIG. 1, the fluorescent display tube 1 is disposed with the playback time display 12, the dubbing display 14 and the high-speed dubbing display 15, but these may be omitted because the percentage of completion of dubbing, the dubbing direction, and the dubbing speed can be displayed by the illumination display unit 13. By omitting these, the compactness of the display screen can be promoted. Or, the visibility can be improved by enlarging the illumination display unit 13. The invention may also be configured to display other information with the illumination display unit, and not just the percentage of completion of dubbing, the dubbing direction, and the dubbing speed. For example, a plurality of two or more types of illumination bars whose light-emitting colors are respectively different may be disposed, and the recording rate or the like may be represented by switching the light-emitting colors. In this case, the compactness of the display screen can be promoted because the recording rate display 11 can be omitted.

Next, an example of the display of the illumination display unit 13 in the fluorescent display tube 1 when data is dubbed in the ordinary speed mode from the HDD recording/playback unit 104 to the DVD recording/playback unit 105 will be described in detail using FIGS. 7A to 7C.

Figure 7A:
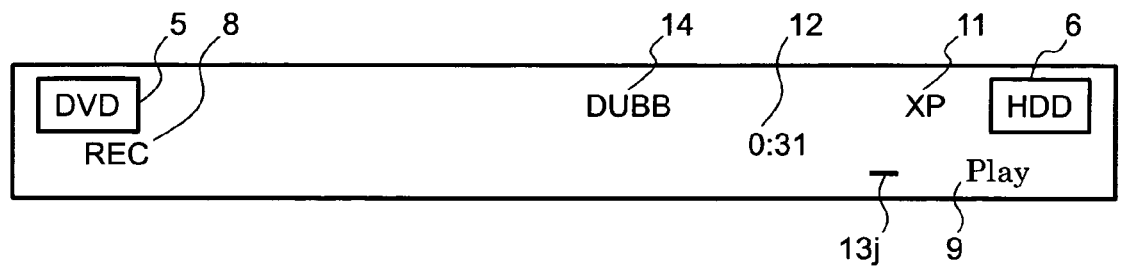
FIGS. 7A to 7C are diagrams showing a first example of the display of a fluorescent display tube.
Figure 7B:
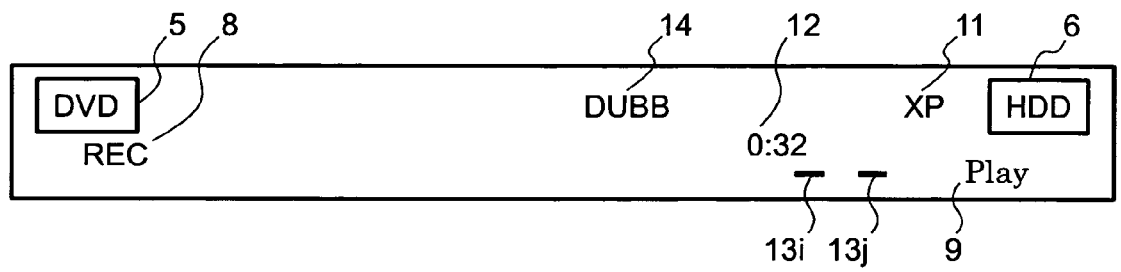
Figure 7C:
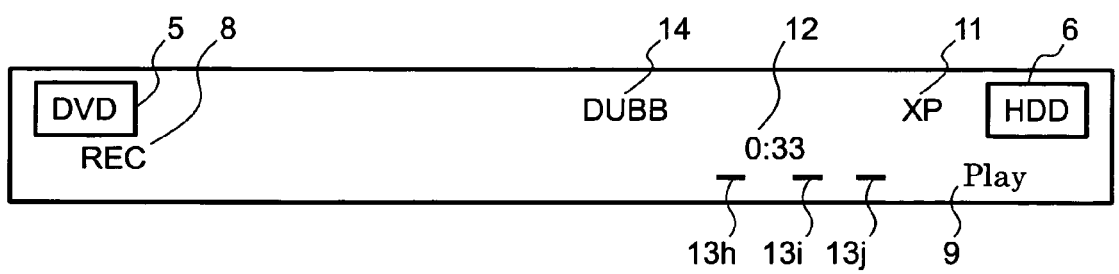

FIGS. 7A to 7C show an example of the display of the fluorescent display tube 1 when data is dubbed from the HDD recording/playback unit 104 to the DVD recording/playback unit 105. In this example, ten illumination bars are used and the display is switched each time the percentage of completion advances 10%, but the number of illumination bars is not limited to this. For example, five or twenty illumination bars may also be used in accordance with the size of the display screen. An example of the display of the fluorescent display tube 1 when the percentage of completion of dubbing is at the first stage (percentage of completion 1) will be described using FIG. 7A. The percentage of completion 1 is between from when dubbing is started to until the percentage of completion reaches 10%. In the percentage of completion 1, one illumination bar 13j blinks on and off. When the dubbing mode is the high-speed mode, the time in which the blinking is switched becomes shorter. For example, in the ordinary speed mode, the interval between the blinks is 1 second. When the speed at which dubbing is conducted in the high-speed mode is twice the ordinary speed, the interval between the blinks is 0.5 seconds. And when the speed at which dubbing is conducted in the high-speed mode is five times the ordinary speed, the interval between the blinks is 0.2 seconds.

An example of the display of the fluorescent display tube 1 when the percentage of completion of dubbing has reached the second stage (percentage of completion 2) will be described using FIGS. 7A and 7B. The percentage of completion 2 is the display between from when dubbing is started to until the percentage of completion reaches 10% to 20%. Each time the percentage of completion increases by 10%, the next stage is reached (e.g., percentage of completion 3, percentage of completion 4, and so on). As shown in FIG. 7A, first the illumination bar 13j blinks on and off, and after a predetermined period of time, the illumination bars 13i and 13j blink on and off, as shown in FIG. 7B. Then, after a predetermined period of time, the display returns to the display of FIG. 7A, and thereafter the displays of FIGS. 7A to 7B are repeated. When the dubbing mode is the high-speed mode, the interval of the switching between the displays of FIGS. 7A and 7B becomes shorter. For example, in the ordinary speed mode, the interval between the blinks is 1 second, and when the speed at which dubbing is conducted in the high-speed mode is twice the ordinary speed, the interval between the blinks is 0.5 seconds. In the percentage of completion 2 also, the dubbing speed may be displayed by causing the illumination bars to blink on and off.

When the percentage of completion of dubbing reaches the third stage (percentage of completion 3), display is conducted using the illumination bars 13h, 13i and 13j, as shown in FIGS. 7A to 7C. Thereafter, the number of illumination bars used for the lighting is increased in accordance with the advance of the percentage of completion, and the sequential lighting of the illumination bars towards the DVD recording/playback unit display 5 is repeated and advances until the end of dubbing.

As described above, when data is dubbed between the HDD recording/playback unit 104 and the DVD recording/playback unit 105, the illumination bars of the illumination display unit 13 are used so that the percentage of completion of dubbing is displayed by the number of lighted illumination bars, the dubbing direction is displayed by sequentially lighting illumination bars of a number corresponding to the percentage of completion of dubbing, beginning with the illumination bar closest to the dubbing source and moving towards the illumination bar closest to the dubbing destination, and the dubbing speed is displayed by the time of switching of the sequentially lighted illumination bars. Thus, by displaying the dubbing direction, the dubbing speed, and the percentage of completion of dubbing using one illumination display unit, the display can be enlarged even when the display screen is limited, and the visibility can be improved. It will be noted that the information displayed by the illumination display unit is not limited to the dubbing direction, the dubbing speed, and the percentage of completion of dubbing as described above. For example, the illumination bars may also be arranged so that their colors alternate (e.g., so that 13j is red, 13i is blue, and 13h is red), and the colors may be changed by causing the illumination bars to alternately light in accordance with the recording rate or the like, whereby other information such as the recording rate or the like is also displayed.

Figure 8A:
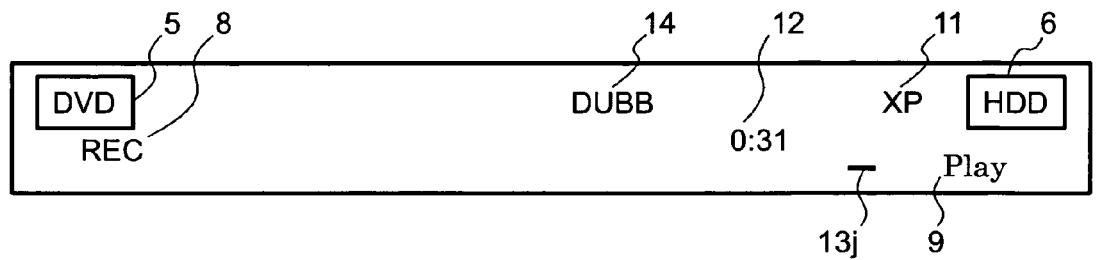
FIGS. 8A to 8C are diagrams showing a second example of the display of the fluorescent display tube.
Figure 8B:
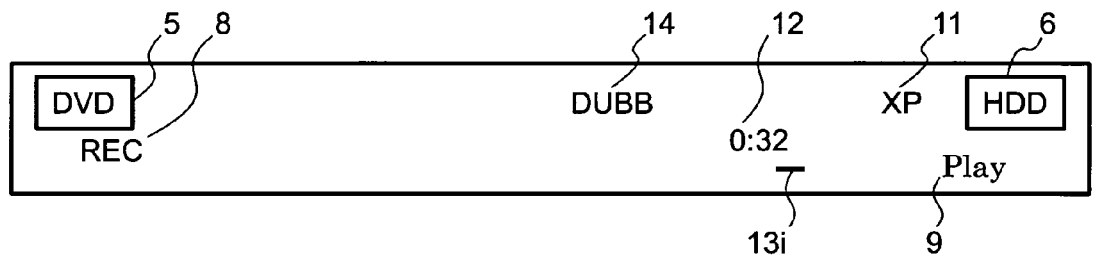
Figure 8C:
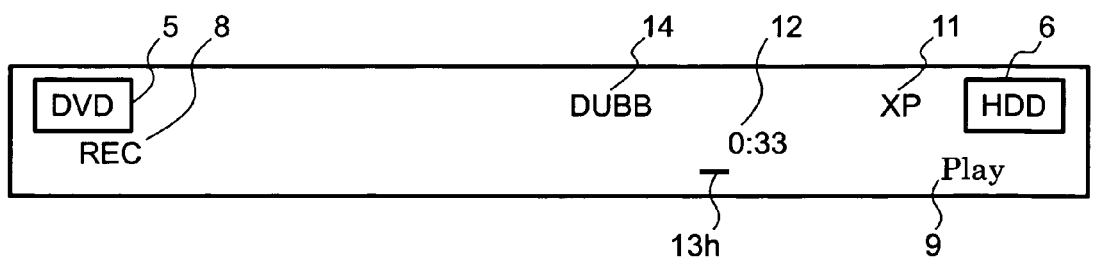

A second example of the display at the time of dubbing will be described. FIGS. 8A to 8C show an example of the display of the fluorescent display tube 1 when data is dubbed from the HDD recording/playback unit 104 to the DVD recording/playback unit 105. In FIGS. 8A to 8C, the same reference numerals will be used for portions that are the same as those shown in FIGS. 7A to 7C, and description of those same portions will be omitted.

FIGS. 8A to 8C show a state where the lighting of the illumination bars at the percentage of completion 3 is switched. As shown in FIG. 8A, first the illumination bar 13j is lighted. After a predetermined period of time, the illumination bar 13i is lighted, as shown in FIG. 8B. Then, after a predetermined period of time, the illumination bar 13h is lighted, as shown in FIG. 8C. Then, after a predetermined period of time, the display returns to the display of FIG. 8A, and thereafter the displays of FIGS. 8A to 8C are repeated.

In this example, power consumption can be reduced because it suffices for the illumination bars to be lighted one at a time. For example, the invention may be configured so that display is ordinarily conducted with the method shown in FIGS. 7A to 7C, and so that the display method is switched to the display method shown in FIGS. 8A to 8C when the user sets the display method to a mode that reduces the power consumption of the recording/playback apparatus. Thus, the display method can be switched in accordance with the state of use of the recording/playback apparatus.

Figure 9A:
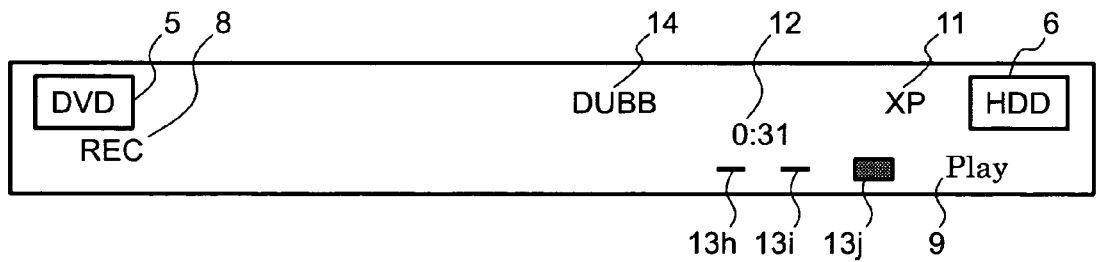
FIGS. 9A to 9C are diagrams showing a third example of the display of the fluorescent display tube.
Figure 9B:
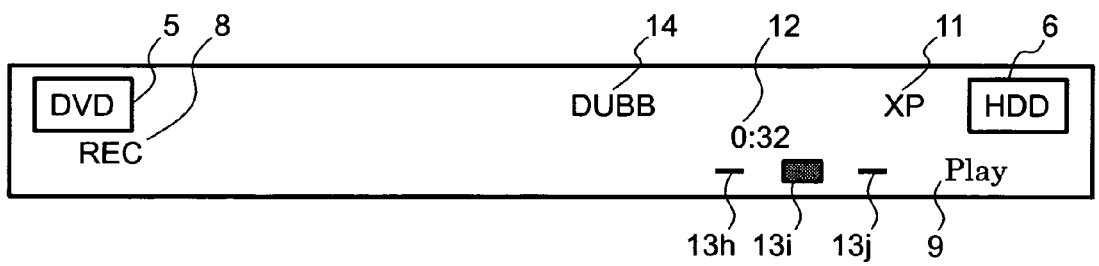
Figure 9C:
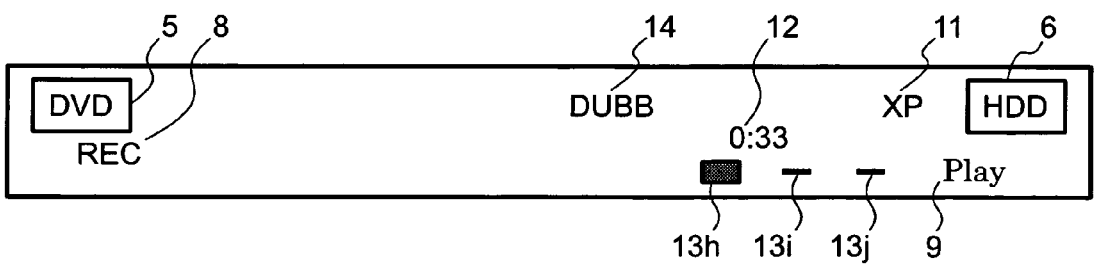

A third example of the display at the time of dubbing will be described. FIGS. 9A to 9C show an example of the display of the fluorescent display tube 1 when data is dubbed from the HDD recording/playback unit 104 to the DVD recording/playback unit 105. In FIGS. 9A to 9C, the same reference numerals will be used for portions that are the same as those shown in FIGS. 7A to 7C, and description of those same portions will be omitted.

FIGS. 9A to 9C show a state where the lighting of the illumination bars at the percentage of completion 3 is switched. In FIG. 9A, the illumination bars 13i and 13h are lighted, and the illumination bar 13j blinks on and off. Next, as shown in FIG. 9B, the blinking illumination bar is switched from the illumination bar 13j to the illumination bar 13i. Thereafter, the blinking illumination bar is switched.

In this example, illumination bars of a number corresponding to the progress are lighted, and one of those illumination bars is caused to blink on and off. Thus, information relating to the dubbing, such as the percentage of completion, can be displayed in a manner that is more easily viewable.

In this example, the invention was configured so that the sequentially lighted portion was moved within the number of illumination bars corresponding to the percentage of completion in order to display the dubbing direction, but the invention may also be configured so that illumination bars of a number corresponding to the percentage of completion are first lighted, then after a predetermined period of time, the sequentially lighted portion is moved using all or some of the illumination bars to display the direction, and then the display again returns to the display of the progress and is thereafter repeated.

As described above, plural types of information, such as the dubbing direction, the dubbing speed, and percentage of completion of dubbing, can be displayed using one illumination display unit. Thus, information relating to dubbing can be displayed in a manner that is more easily viewable, even when the display screen of the recording/playback apparatus is limited. In the preceding examples, the invention was configured to display plural types of information at one time, but the invention may also be configured so that the illumination display unit switches between percentage of completion display/direction display and speed display/display information in accordance with an operation by the user or every predetermined period of time.

In the preceding examples, the recording media of the recording/playback units were a HDD and a DVD, but the recording media are not limited to these. For example, the recording media may also be tapes, discs, or memory cards. Moreover, the recording/playback unit displays may also be increased in accordance with the number of recording/playback units disposed in the recording/playback apparatus. For example, when there are three recording/playback units, such as a HDD, a DVD and a D-VHS, the recording/playback apparatus may be disposed with a HDD recording/playback unit display, a DVD recording/playback unit display and a D-VHS recording/playback unit display, and illumination display units may be disposed between these displays.

It will be noted that although the multi-display unit was described using examples of displays by a fluorescent display tube, the multi-display unit is not limited to this. For example, display on a monitor screen and display using an LED as the illumination display unit can also be done.

As described above, an apparatus can be provided which improves the visibility of dubbing mode display and which improves usability.

What is claimed is:

1. A recording/playback apparatus comprising:
   a first recording/playback unit;
   a second recording/playback unit;
   a display unit that includes a first display representing the first recording/playback unit, a second display representing the second recording/playback unit, and a light-emitting line comprising a plurality of light-emitting points and disposed between the first display and the second display; and
   an input unit to which is inputted a start instruction of dubbing for transmitting and receiving data between the first recording/playback unit and the second recording/playback unit, wherein
   the display unit indicates a direction of the dubbing, indicates a percentage of completion of the dubbing as a number of the light-emitting points emitting light and an ending position of the light-emitting line, and indicates a speed of the dubbing with respective periods of blinking on and off the plurality of light-emitting points, when the start instruction is inputted to the input unit and the dubbing is started.

2. A recording/playback apparatus comprising:
   a first recording/playback unit;
   a second recording/playback unit;
   a display unit that includes a first display representing the first recording/playback unit, a second display representing the second recording/playback unit, and a light-emitting line comprising a plurality of light-emitting points and disposed between the first display and the second display; and
   an input unit to which is inputted a start instruction of dubbing for transmitting and receiving data between the first recording/playback unit and the second recording/playback unit, wherein:
   the display unit indicates a direction of the dubbing, indicates a percentage of completion of the dubbing as a number of the light-emitting points emitting light and an ending position of the light-emitting line, and indicates a speed of the dubbing with respective periods of blinking on and off the plurality of light-emitting points, when the start instruction is inputted to the input unit and the dubbing is started, and
   when data is dubbed from the second recording/playback unit to the first recording/playback unit, the display unit (1) selects, from among the plural light-emitting points, light-emitting points, the number of which corresponds to the percentage of completion of dubbing, beginning with the light-emitting element closest to the second display, and (2) sequentially lights the selected light-emitting points in accordance with the dubbing speed.

3. The recording/playback apparatus of claim 1, wherein when data is dubbed from the second recording/playback unit to the first recording/playback unit, the display unit sequentially lights, from among the plural light-emitting points, light-emitting points, the number of which corresponds to the percentage of completion of dubbing, beginning with the light-emitting element closest to the second display.

4. The recording/playback apparatus of claim 1, wherein the plural light-emitting points comprise plural types of light-emitting points whose light-emitting colors are respectively different, and the light-emitting colors are switched in accordance with the recording rate of dubbing.

5. An information processing apparatus comprising:
   a first information processing unit;
   a second information processing unit; and
   a display unit that includes a first display representing the first information processing unit, a second display representing the second information processing unit, and a light-emitting line comprising a plurality of light-emitting points and disposed between the first display and the second display, wherein
   the display unit indicates a direction of the dubbing, indicates a percentage of completion of the dubbing as a number of the light-emitting points emitting light and an ending position of the light-emitting line, and indicates a speed of the dubbing with respective periods of blinking on and off the plurality of emitting points, when data is transferred and received between the first information processing unit and the second information processing unit.

6. A recording/playback apparatus comprising:
   a first recording/playback unit;
   a second recording/playback unit;
   a display unit that includes a first display representing the first recording/playback unit, a second display representing the second recording/playback unit, and a light-emitting line comprising a plurality of light-emitting points and disposed between the first display and the second display; and
   an input unit to which is inputted a start instruction of dubbing for transmitting and receiving data between the first recording/playback unit and the second recording/playback unit, wherein:
   the display unit indicates a percentage of completion of dubbing as a number of the light-emitting points emitting light, and indicates a direction of the dubbing by selecting at least one of the light-emitting points in turn and blinking on and off the selected at least one of the light-emitting points, when the start instruction is inputted to the input unit and the dubbing is started; and
   the display unit indicates speed of dubbing with respective periods of blinking on and off the at least one of the light-emitting points.

7. The recording/playback apparatus according to claim 6, wherein when data is dubbed from the second recording/playback unit to the first recording/playback unit, the light emitting points emitting light to indicate the percentage of completion extend from one light emitting point closest to the second display.

* * * * *